Oct. 4, 1932.   H. H. WILLIAMS   1,880,305
AXLE HOUSING
Original Filed Jan. 23, 1926
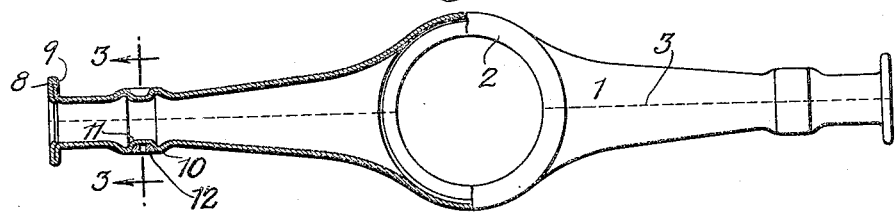
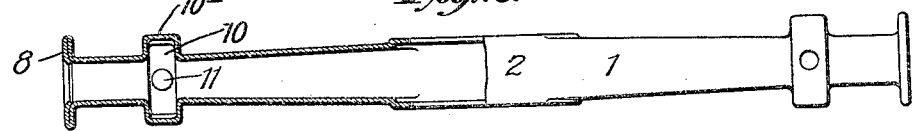
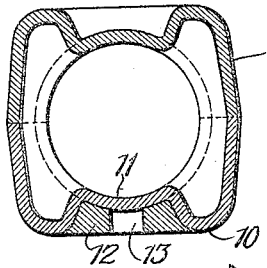
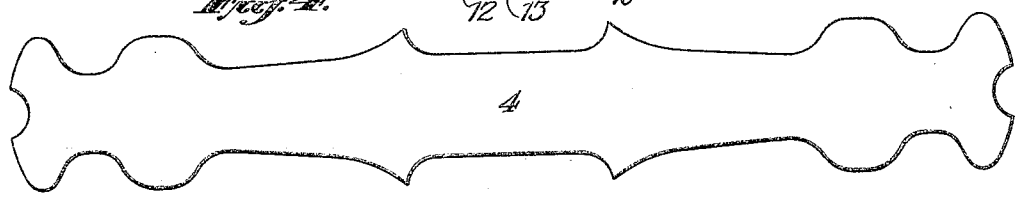
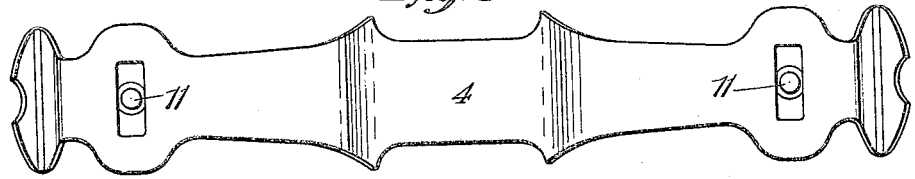
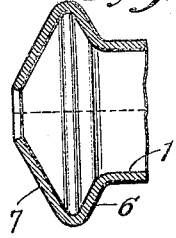
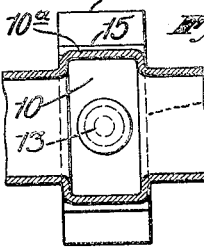
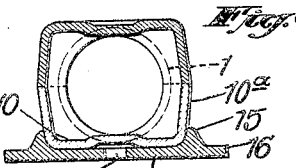
INVENTOR
HERBERT H. WILLIAMS.
BY
D. Anthony Usina, ATTORNEY Patented Oct. 4, 1932

1,880,305

UNITED STATES PATENT OFFICE

HERBERT H. WILLIAMS, OF BROOKLYN, NEW YORK, ASSIGNOR, BY MESNE ASSIGNMENTS, TO METROPOLITAN ENGINEERING CORPORATION, OF BROOKLYN, NEW YORK, A CORPORATION OF NEW YORK

AXLE HOUSING

Original application filed January 23, 1926, Serial No. 83,331. Divided and this application filed December 31, 1927. Serial No. 243,793.

In my application Serial No. 83,331, filed January 23, 1926, (Patent No. 1,689,989, granted October 30, 1928), I have described a certain method of making axle housings. The present application is a division thereof directed to the axle housing and related parts.

The accompanying drawing illustrates embodiments of the invention.

Fig. 1 is a partial elevation and partial vertical section of a housing;

Fig. 2 is a partial plan and partial horizontal section of the same;

Fig. 3 is a cross-section on the line 3—3 of Fig. 1;

Fig. 4 is a plan of one of the blanks from which the housing is formed;

Fig. 5 is a similar view showing the next operation on the blank;

Fig. 6 is a longitudinal section of Fig. 5;

Fig. 7 is a vertical section of an end of the housing at an intermediate stage in its production;

Fig. 8 is a horizontal section, and Fig. 9 a vertical transverse section of an alternative method of forming a saddle;

Fig. 10 is a perspective of a bar from which the filler of Fig. 3 is cut;

Fig. 11 is a similar view of a rolled bar from which the plate 14 of Fig. 9 is cut.

Housings for rear axles of automobiles are of various designs. Most, if not all of them, have tubular ends, an enlarged annular center with inward flanges surrounding openings for the introduction of the gearing, saddles or similar devices for engagement by springs and other parts of the car and flanges at the ends for stiffening the latter and connecting them to adjacent parts of the wheel and axle bearings. The present invention is illustrated in connection with one design of such a housing, but it will be understood that it is applicable to housings of various other designs and proportions. The housing comprises tubular end portions 1 and an enlarged central portion 2 and is made of two segments united along the horizontal plane indicated by the line 3, Fig. 1, by butt welding.

Fig. 4 illustrates a flat blank from which one of the segments is formed by bending up the edges to the appropriate cross-section at different points. A plan of the segment bent up from this blank would appear as indicated at the left of Fig. 2. Before bending to the segmental form, however, the blank is given a preliminary bending operation indicated in Figs. 5 and 6. The middle portion 4 of the blank is bent downward. Each of the end portions may be of extra width where a saddle or other fixture is to be provided, and a central portion 5 is drawn or stamped so as to project outward. Also the ends of the blank, shaped originally as in Fig. 4, are bent first outward as at 6 and then inward as at 7 to form a sort of V-shaped outward projection. The blank of Fig. 6 is then drawn to the segmental shape and two such blanks are placed edge to edge and united, preferably by welding, though other means of uniting them may be used.

When the segments are first welded the ends are shaped as in Fig. 7. They are thereafter swaged so as to press the parts 7 and 6 together and to a position transverse to the axis of the tubular part 1, as indicated at 8 and 9 in Fig. 1. An advantage of this method is that the pressure is continued to bring the flanges to a determined distance from the transverse axis of the housing so as to exactly gauge the length of the latter and to make each half of the same length, and this simultaneously with the forming of the flanges. They thus form a rib of double thickness re-inforcing the ends and providing a stiff part for connection to the wheel bearings and adjacent parts.

When the segments are welded the portions 5 constitute projections 10 with side walls 10a beyond the line of the tube, stiffening the latter at these points. Each of the projecting portions 10 may be provided with a circular inward depression 11. A filler 12 may be welded into the depression 11 and serves as part of the seat. The filler has a hole 13 in the center to provide a clearance for the head of the bolt which holds together the leaves of the spring on which the housing bears. The hole thus serves to center the spring on the axle housing and the thrust of driving is partly transmitted through the bolt.

According to Figs. 8 and 9, the segments are placed as before, but on the underside of the flat portion 10 a spring seat is welded in the form of a broad plate 14 which may be made of a certain standard rolled steel section cut to the required width so as to extend slightly beyond the sides of the housing. Such a spring seat or saddle may be shaped on its top surface to conform with housings which are of various contours at the point of attachment; whether of the enlarged stiffened shapes illustrated in Figs. 3 and 9 or of the ordinary circular shape or of other usual or suitable shapes. In any case the cross-section of the saddle will be such that it can be economically produced from shapes rolled in the ordinary way. A filler similar to 12, Fig. 3, may be located between the plate 14 of Fig. 9 and the recess in the under side of the part 10 of the housing. Or the plate 14 may be rolled with a protecting portion to fit the recess on the under side of the housing. Fig. 8 shows that the seat or saddle 14 is a simple rolled section with the center part of its face contoured in cross-section to that of the bottom of the housing with side ribs 15 embracing the latter and flanges 16 contributing the extra width desired. A strip of this sort can be rolled and sheared into lengths such as are shown in Fig. 8. The underside of the enlargement 10 may be flat so as to bear the cross-section's weight on the seat 14. The spring seat may be applied either to the bottom of the housing as shown or to the top thereof.

Fig. 10 shows a rolled steel bar corresponding in section to the part 12 of Fig. 3, and Fig. 11 a rolled steel bar corresponding in section to the plate 14 of Fig. 9. Pieces of these rolled bars need only to be cut to length and punched to produce the desired seats. Each of these seats is of uniform cross-section throughout its length so that no work is necessary on it (except punching the central opening 13) after cutting it the desired length.

The invention contemplates the making of the end flange integral with the segments of an extra thickness, whether this be secured by the bending arrangement described or by otherwise forming up the metal at the ends of the segments. For example the segments may have the metal beyond the indicated end of the housing of any suitable shape and this metal may be upset by pressing it inward to a determined distance from the center as above described to the exact gauge and to the desired shape and extra thickness.

Various modifications in the details may be made and in the arrangement of the parts by those skilled in the art without departure from the invention as defined in the following claims.

What I claim is:—

1. An axle housing made of segments of sheet metal and having tubular end portions at an intermediate point in the length of which the segments are bent out to form integral enlargements of substantially the same thickness as the adjacent parts and constituting bearing points for spring seats.

2. An axle housing having tubular end portions at an intermediate point in the length of which there are integral enlargements with inward depressions on the undersides constituting bearing points for spring seats.

3. An axle housing having tubular end portions at an intermediate point in the length of which there are integral enlargements constituting bearing points in combination with spring seats having upper faces shaped to conform with the contour of said enlargements and welded thereto.

In witness whereof, I have hereunto signed my name.

HERBERT H. WILLIAMS.